US006627079B2

(12) United States Patent
Koivula

(10) Patent No.: US 6,627,079 B2
(45) Date of Patent: Sep. 30, 2003

(54) APPARATUS FOR FILTERING A LIQUID

(75) Inventor: Tuomo Koivula, Tampere (FI)

(73) Assignee: Parker Hannifin OY, Urjala AS (FI)

( * ) Notice: Subject to any disclaimer, the term of this patent is extended or adjusted under 35 U.S.C. 154(b) by 16 days.

(21) Appl. No.: 09/897,299

(22) Filed: Jul. 2, 2001

(65) Prior Publication Data

US 2002/0020681 A1 Feb. 21, 2002

Related U.S. Application Data

(63) Continuation of application No. PCT/FI00/00975, filed on Nov. 9, 2000.

(30) Foreign Application Priority Data

Nov. 11, 1999 (FI) .............................................. 19992428

(51) Int. Cl.$^7$ .............................................. B01D 29/66
(52) U.S. Cl. .................. 210/248; 210/333.01; 210/410; 210/411
(58) Field of Search ................................ 210/248, 332, 210/333.01, 409, 410, 411, 416.1, 416.4, 340

(56) References Cited

U.S. PATENT DOCUMENTS

| | | |
|---|---|---|
| 2,365,766 A | 12/1944 | Levier |
| 2,383,672 A * | 8/1945 | Neisingh ................ 210/410 |
| 4,055,500 A | 10/1977 | Parker |
| 4,256,583 A | 3/1981 | Lennartz |
| 4,341,642 A | 7/1982 | Koepke et al. |
| 6,248,246 B1 | 6/2001 | Koivula |
| 6,368,497 B1 | 4/2002 | De Sylva |

FOREIGN PATENT DOCUMENTS

| | | | | |
|---|---|---|---|---|
| GB | 755243 | * | 8/1956 | ................ 210/410 |
| WO | WO00/18488 | | 5/2000 | |

OTHER PUBLICATIONS

Copy of International Search Report from corresponding PCT Application No. PCT/FI00/00975.
Copy of the International Application Published Under the PCT (WO 01/342740 In PCT Application No. PCT/FI00/00975.

* cited by examiner

Primary Examiner—Matthew O. Savage
(74) Attorney, Agent, or Firm—Christopher H. Hunter

(57) ABSTRACT

The invention relates to a method and apparatus for filtering a liquid. The filtering is conducted using one or several filter elements in the filter housing, the operation being based on the alternation of filtering stages and air flushing stages. According to the invention, upon transferring from the flushing stage to the filtering stage, the filter housing is filled with liquid so that the liquid pushes the flushing air in the housing from the upper end of the housing into a separate air container so that air is compressed to a higher pressure in the container. During the filtering stage, air remains in the container, and after the filtering stage, air compressed in the container is allowed to push liquid out of the filter housing with its pressure. Further, the connection between the air container and the filter housing can be arranged so that air compressed in the container participates in the backflushing of the filter elements. The invention is especially applicable to an automatic filter filtering fuel or lubricant in a diesel motor.

15 Claims, 3 Drawing Sheets

APPARATUS FOR FILTERING A LIQUID

CROSS REFERENCE TO RELATED APPLICATIONS

This application is a continuation of copending International Application No. PCT/FI00/00975, filed Nov. 9, 2000, which designated the United States, and claims priority to Finish Patent Application 19992428, filed Nov. 11, 1999.

BACKGROUND OF THE INVENTION

The present invention relates to a method for filtering a liquid, using at least one filter element in a filter housing, in which method the housing is drained of the liquid after each filtering period, and the element is cleaned with flushing air directed through the housing. Further, the invention relates to a filtering apparatus intended for carrying out the method.

Continuous automatic filters with alternating filtering and flushing periods, are used, for example, in diesel motors for filtering fuel or lubricant. The filtering is used for removing the principally solid impurities wearing the motor.

Patent publication U.S. Pat. No. 4,256,583 discloses a filtering apparatus, in which the filtering is conducted alternately in two parallel filtering chambers, controlled by a rotating valve. The filtering chambers are cleaned with backflushing between the filtering periods.

Patent application FI 982113, which is related to the present application, discloses a filtering apparatus with three filtering units controlled with a common valve, two of the filtering units being intended to operate alternately in the actual filtering process, and the third one forming a reserve unit, into which the flow to be filtered is directed when the first two units are being serviced. The valve may comprise a spindle with circular cross-section, the operation of which is based on axial and rotary movement around its axis.

When after the filtering stage, the flushing stage is begun, the housing is full of liquid, which the pressurised air used for the flushing pushes ahead into a separate reject channel. Besides emptying the filter housing, the flushing air flow cleans the filter elements in the housing with backflushing. After the flushing stage, the filter housing is again filled with liquid, according to the above patent application FI 982113, with liquid to be filtered, which is directed from the inlet assembly for the filtered flow, for initiating the filtering stage. The flushing air in the filter housing is then discharged into the air vent beginning from the upper end of the filter housing. Air should be removed from the filter housing as completely as possible, because, for example, in a diesel motor, air bubbles must not be allowed to mix with the filtered fuel or lubricating oil. Some solutions are known, in which a float has been arranged in the upper end of the filter housing to close the exit route for air, as the housing is being filled with liquid. After this, it is possible to open the outlet assembly for the filtered flow so that filtering may be conducted as a flow-through from the inlet assembly through the casing of the filter element into the outlet assembly.

SUMMARY OF THE INVENTION

The object of the invention is to provide a solution with which the construction formed by the filter housing and related channels can be simplified, the emptying of the filter housing from liquid may be intensified at the beginning of the flushing stage, and the chance that air and the liquid to be filtered is mixed during the filtering stage can be completely eliminated. It is characteristic of the method of the invention that, after the flushing stage, the filter housing is filled with liquid so that the liquid pushes the flushing air from the upper end of the housing into a separate air container so that air is compressed to a higher pressure and that, after the end of the next filtering stage, liquid is pushed out of the filter housing with the pressure of air compressed into the air container.

Thus, it is achieved with the invention that the air remaining in the filter housing after the flushing stage does not need to be removed from the filtering process, and no corresponding outlet channels are needed for it but, on the contrary, this air may be stored to be utilized at a later stage of the process. As the air container is separate from the filter housing, the liquid directed into the housing may also be allowed to fill part of the air container so that no air is left in the filter housing, and also air in the air container is effectively isolated from the filter housing. Thus, there is no chance that air and liquid will be mixed in the filter housing during the filtering stage. After the filtering stage, air compressed into the air container effectively drains the filter housing from liquid so that it is then possible to direct the actual flushing air flow into the substantially empty filter housing.

Emptying the filter housing substantially from liquid at the end of the filtering stage merely by opening the reject channel is also of advantage taking into consideration service measures performed in the filter housing. In the filter housing, the liquid to be filtered may be, for example, fuel oil at the temperature of 100–150° C. which, for reasons of safety, is removed from the housing before opening the cover of the housing. In known solutions, backflushing should be performed in the filter housing before the cover of the housing can be opened.

According to an especially advantageous embodiment of the invention, the discharge of compressed air from the air container into the filter housing occurs so that air participates in the backflushing of the filter element or elements. The flushing effect of air is most intensely directed to the upper end of the filter element, which first becomes free of the discharging liquid. As the air pressure drops, the flushing effect to the lower parts of the filter element is less. If however, the actual flushing air flow led through the lower part of the filter housing is simultaneously initiated, efficient backflushing is achieved to both ends of the element at the same time.

The filtering apparatus of the invention intended to be used for applying the above method comprises at least one filter element placed in the filter housing, which filter element is equipped with an inlet assembly for the liquid flow to be filtered, with an outlet assembly for the filtered flow, and with an air channel for cleaning the filter element with air flushing between the filtering periods. According to the invention, it is essential in the apparatus that the upper end of the filter housing is connected to the air container through a connection channel, air in the housing being arranged to be compressed in the air channel as the housing is filled with liquid.

There is advantageously a connection from the air container through the connecting channel to the exhaust side of each filter element in the filter housing, i.e. to the side from which the filtered liquid flow is discharged to the outlet assembly, so that the air discharging under pressure from the air container is available for the backflushing of the element.

From the point of view of the design and space utilization of the apparatus, it may be appropriate to arrange the air container partly or entirely lower than the upper end of the filter element and to arrange the connecting channel to connect the upper end of the filter housing with the lower end of the air container. As cylindrical filter elements, so-called candles, are typically used in the filter housing, the center of the housing is easily left with unused space, which may especially advantageously be utilized by changing it to the air container required by the invention. The candle-shaped filter elements may then be placed as a ring around the air container, or it is possible to arrange only one single cylindrical filter element of sandwiched or fluted filtering material to surround the air container in the filter housing.

DETAILED DESCRIPTION OF THE PREFERRED EMBODIMENT

Figure 1:
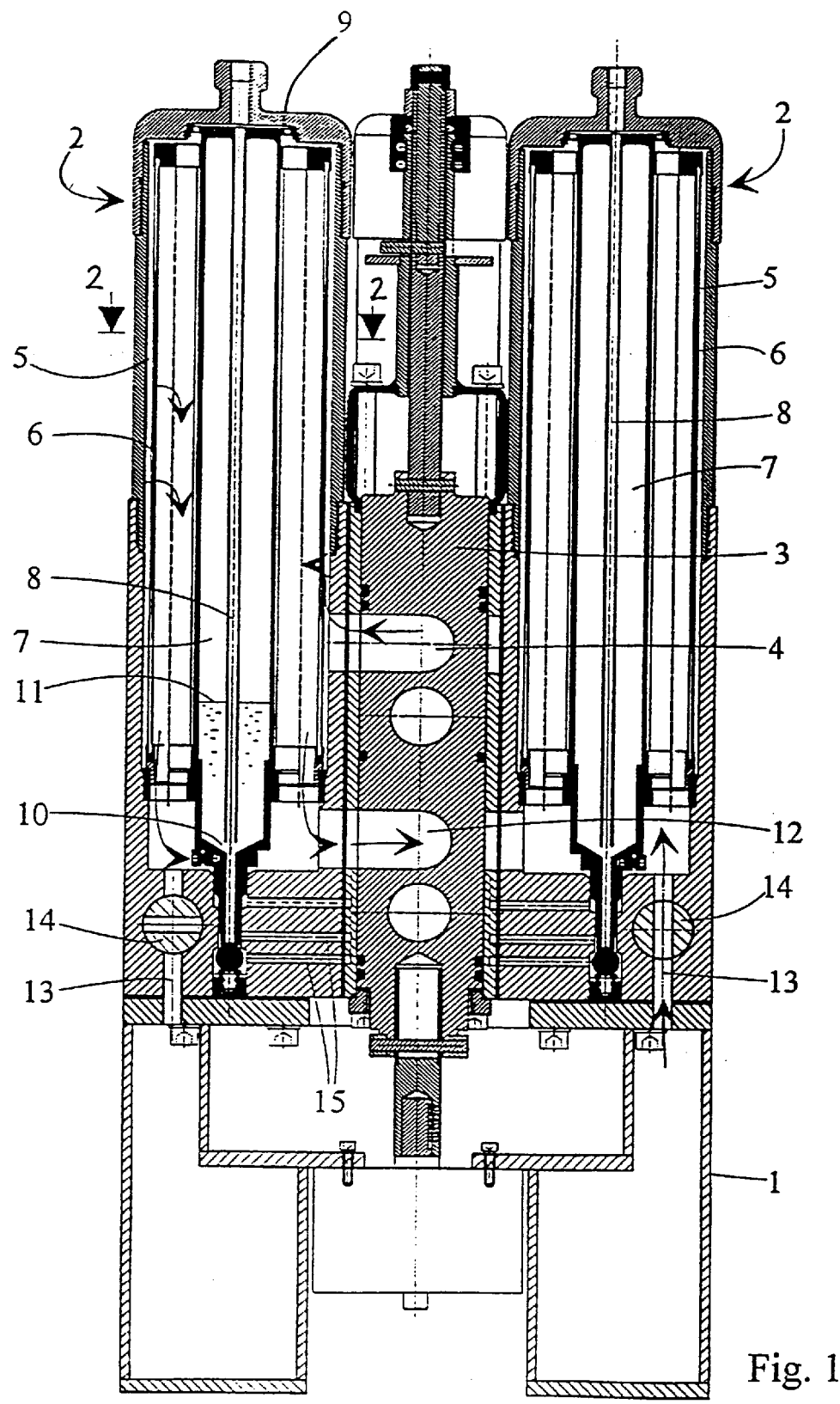
FIG. 1 shows a filtering apparatus of the invention in vertical section.

The filtering apparatus according to FIG. 1, which is suitable, for example, for an automatic filter of a fuel or lubricant system in a diesel motor, comprises according to the figure, a base 1 and two parallel filtering units 2, on the alternating use of which the operation of the apparatus is principally based. The filtering units 2 are controlled with a spindle 3 so that, as the filtering is running in the one unit, the second unit is being cleaned by backflushing with pressurised air, whereafter the operations are switched between the units. The apparatus further includes a third filtering unit controlled by the same spindle 3, which is located behind the spindle in the figure, and which operates as a reserve unit during the service of the units 2 seen in the figure. Of these parts, the structure and operation of the apparatus corresponds to those disclosed in the patent application FI 982113, filed Sep. 30, 1998, or the international application PCT/FI99/00798, filed Sep. 29, 1999, now U.S. Pat. No. 6,248,246, which is incorporated herein by reference as part of this specification.

Figure 2:
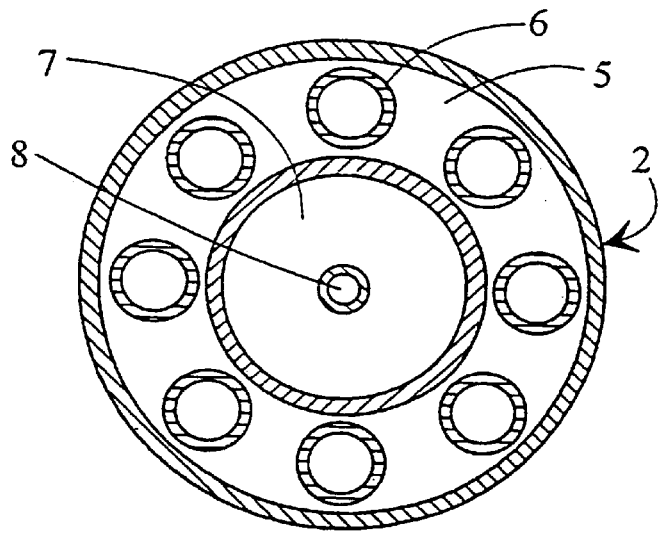
FIG. 2 shows a horizontal section of the filtering unit in the apparatus taken substantially along the plane defined by the lines 2—2 in FIG. 1.

In FIG. 1, the leftmost of the two filtering units 2 is in the filtering stage, in which the travel of the flow to be filtered through the unit is indicated with arrows. The spindle 3 guides the flow to be filtered to the units 2 from a common inlet channel (not shown) through the inlet assembly 4 into the filter housing 5 which, according to FIG. 2, includes eight cylindrical, candle-shaped filter elements 6 arranged as a ring around an air container 7 separated from the center of the filter housing 5. An axial connecting channel 8 connects the upper end 9 of the filter housing 5 and the lower end 10 of the air container 7.

During filtering, the housing is entirely filled with the liquid to be filtered. The liquid to be filtered is infiltrated into the elements through jackets manufactured of filtering material, such as metal or plastic net, into the filter elements 6 in the filter housing 5, and is discharged as cleaned through the open lower ends of the elements into the outlet assembly 8 of the spindle 3, from which the flow is directed into the discharge channel (not shown) common for the filtering units 2.

In the leftmost filter element 2 in FIG. 1, the inlet channel 13 for flushing air is closed by the valve 14 during the filtering stage. The rightmost filtering unit 2 in the figure is shown in the flushing stage, in which the valve 14 is open and the compressed air directed from the base 1 through the air channel 13 backflushes the filter elements 6, whereafter it is discharged into the reject channel (not shown) guided by a reject spindle common to the units 2. At this stage, the filter housing 5 as well as the air container 7 in the middle of the housing, are empty from liquid.

When transferring from the flushing stage to the filtering stage in the filtering unit 2, the filter housing 5 is first filled with liquid directed slowly from separate filling channels 15. At this stage, both the inlet channel 13 for flushing air and the connection to the reject channel are closed. The liquid, with which the filter housing 5 is filled, comprises filtered clean liquid directed from the outlet assembly 12 for the flow. Upon initiating the filling, the filter housings 5 and the air channel 7 connected to it through the connecting channel 8 are full of air. During filling, the liquid pushes air ahead towards the air container 7, so that the air pressure increases. As the filling continues, the filter housing 5 is entirely filled with liquid, and liquid is additionally pushed into the air container 7 through the connecting channel 8 so that liquid fills the lower part of the container. Thus, air present in the filtering unit at the beginning of the filling is compressed into the air container 7, in which it is isolated from the filter housing 5 and in which it stays during the next filtering stage. The filtering stage is initiated by rotating the spindle 3 so that its inlet and outlet assemblies 4, 12 are connected to the respective assemblies of the filtering unit 2, and the flow to be filtered is allowed to travel through the filter housing 5 and through the filter elements 6.

The filtering stage in the filtering unit 2 ends as the spindle 3 rotates so that the flow assemblies 4, 12 into the inlet and outlet channels for the flow are closed. For flushing, the connection from the filter housing 5 into the reject channel is opened so that air compressed in the air container 7 is able to utilise its pressure to push the liquid out of the filter housing. In FIG. 1, the connecting channel 8 connects the air container 7 in the filter housing 5 outside the filter elements 6 so that air compressed in the air container 7 empties the filter housing 5. The backflushing of the filter elements 6 is conducted with pressurised air directed from the flushing air channel 13.

Figure 3:
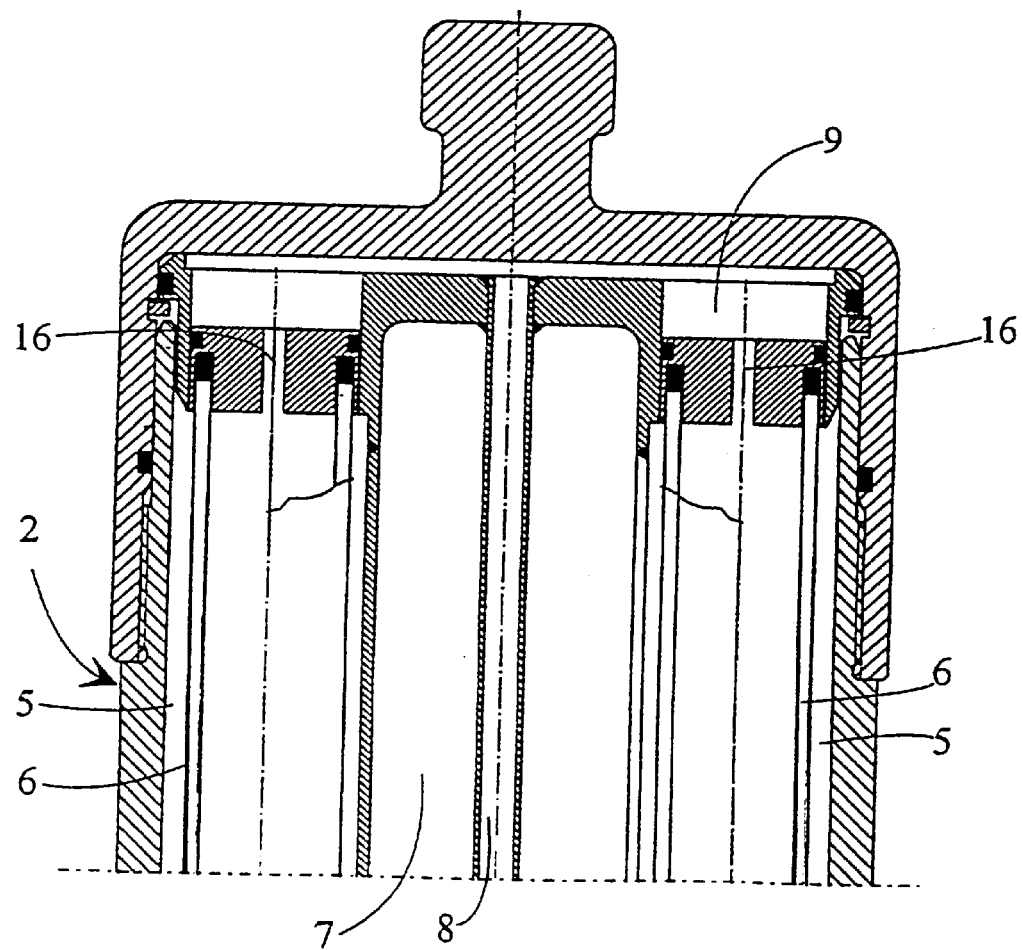
FIG. 3 is a vertical section of the upper end of the filtering unit in accordance with a second embodiment of the invention.

The embodiment of the invention in FIG. 3 differs from the one shown in FIG. 1 in that that the connecting channel 8 leading to the air container 7 is connected inside the filter elements 6 in the housing through the upper end of the filter housing 5. For this purpose, the upper end of each candle-shaped filter element 6 is provided with a flow opening 16. With this arrangement it is achieved that, as the flushing begins, air discharging under pressure from the air container 7 participates in the backflushing of the filter elements 6 as the flushing effect is principally directed to the upper end of the elements. If flushing air flow is simultaneously initiated through the air channel 13, the effect of the flow being most efficiently directed to the lower ends of the filter elements 6, these flows achieve a joint effect, in which the elements are efficiently flushed along their entire length.

Figure 4:
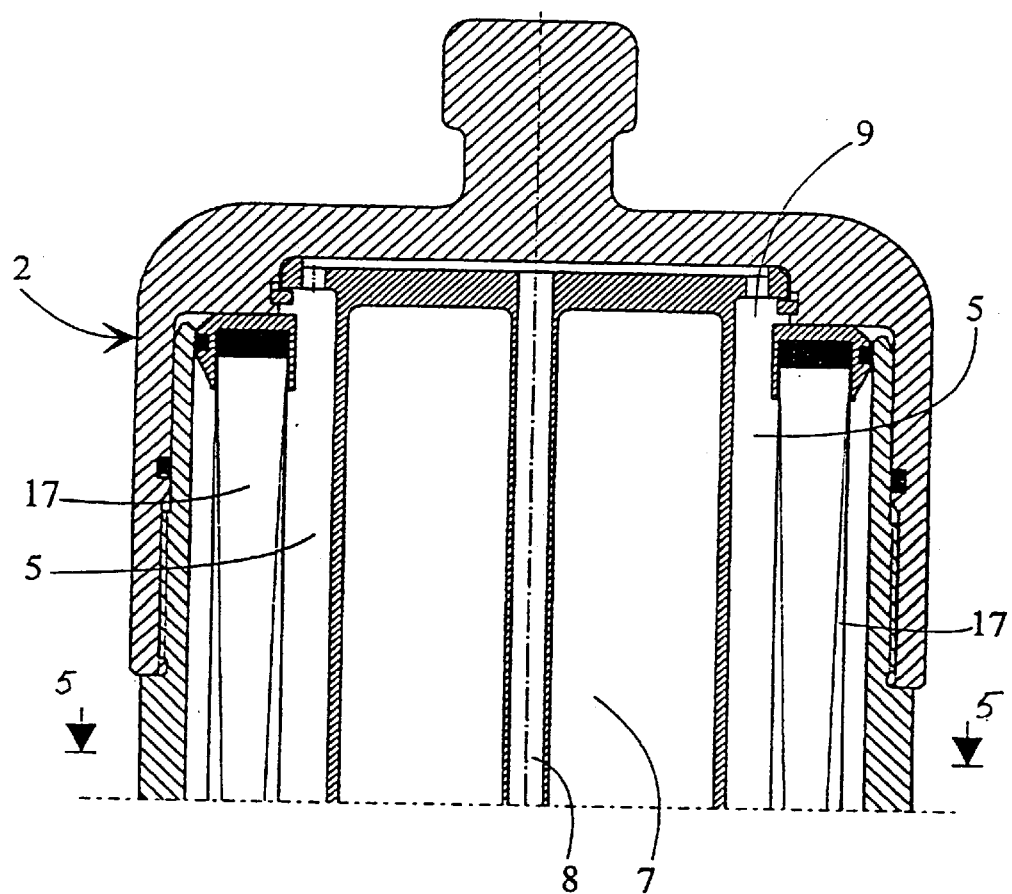
FIG. 4 is a vertical section of the upper end of the filtering unit according to a third embodiment of the invention.
Figure 5:
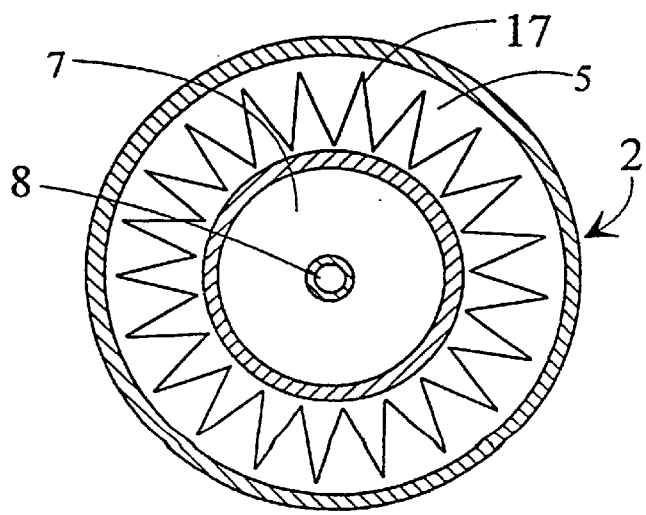
FIG. 5 shows a horizontal section of the filtering unit of FIG. 4 taken substantially along the plane defined by the lines 5—5 in FIG. 4.

FIGS. 4 and 5 show an embodiment of the invention, in which air compressed into the container 7 in accordance with FIG. 3 may be used for backflushing the filter element. Differing from the embodiments in FIGS. 1 and 3, in this embodiment the filter housing 5 comprises one single cylindrical, fluted filter element 17 surrounding the cylindrical air container 7 separated from the center of the filter housing. The connecting channel 8 is connected to the interior of the filter element 17 at the upper end 9 of the filter housing so that air discharging from the air container 7 has to penetrate the jacket of the filter element as it travels into the reject channel forming the exit route for liquid and flushing air.

It is obvious for one skilled in the art that the various embodiments of the invention are not limited to the examples shown above, but they may vary within the scope of the following claims.

What is claimed is:

1. A filtering apparatus comprising at least one filter element in a filter housing, the housing having an inlet assembly for liquid flow to be filtered, an outlet assembly for filtered liquid flow, means defining an air channel for cleaning the filter element with air flushing between the filtering stages, and an air container in the housing, means defining a connection channel that opens into the housing at an upper end of the air container and directs air into a lower portion of the air container such that air is trapped and compressed in an upper portion of the air container as the housing is filled with liquid, and means for fluidly connecting an upper fluid pervious end of the filter element to the connection channel means at the upper end of the air container.

2. The filtering apparatus according to claim 1, wherein said means for fluidly connecting includes an air connection from the air container to an exit side of each filter element in the filter housing so that air compressed into the air container is available for backflushing each element.

3. The filtering apparatus according to claim 1, wherein the air container is at least partly arranged lower than an upper end of the filter housing.

4. The filtering apparatus according to claim 1, wherein a plurality of cylindrical filter elements are arranged in a ring around the air container.

5. The filtering apparatus according to claim 4, wherein the connection channel means is situated in the air container on its vertical axis, terminating close to a lower end of the air container.

6. The filtering apparatus according to claim 1, wherein a cylindrical filter element surrounds the air container in the filter housing.

7. The filtering apparatus as in claim 1, wherein the air channel means includes an elongated, axially extending tube internal to the air container, with one end of the tube supported via an upper end of the air container and open to an upper end of the filter housing, the tube extending toward a lower end of the air container.

8. The filtering apparatus as in claim 1, wherein the other end of the tube terminates at another opening toward the lower end of the air container.

9. The filtering apparatus as in claim 1, wherein a filter element surrounds the air container along at least a portion of the length of the air container.

10. The filtering apparatus as in claim 1, wherein the air container extents substantially the length of the filter housing.

11. A filtering apparatus comprising at least one filter element in a filter housing, the housing having an inlet assembly for directing liquid to be filtered into the housing, an outlet assembly for directing filtered liquid out of the housing, an air container in the housing into which air in the housing can be compressed when the housing is filled with liquid, and means defining a connection channel disposed within the air container, the connection channel extending into the air container from a first end at an upper end of the air container to a lower portion of the air container such that air is trapped and compressed in an upper portion of the air container as the housing is filled with liquid, the connection channel opening into an upper end of the housing to direct air into the air container.

12. The filtering apparatus as in claim 11, wherein the first end of the connection channel is supported via the upper end of the air container.

13. The filtering apparatus as in claim 12, wherein the connection channel terminates proximate a lower end of the air container.

14. The filtering apparatus as in claim 13, wherein the connection channel includes a second opening at the lower end of the air container.

15. The filtering apparatus as in claim 11, wherein the connection channel comprises an elongated, axially-extending tube internal to the air container, with one end of the tube supported via the upper end of the air container and open to the upper end of the housing, and the tube extending toward a lower end of the air container.

* * * * *